E. A. HARVEY.
Thill Coupling.

No. 92,608.   Patented July 13, 1869.

Witnesses

James Moore.

Inventor.
E A Harvey

United States Patent Office.

EDMUND A. HARVEY, OF WILMINGTON, DELAWARE.

Letters Patent No. 92,608, dated July 13, 1869.

IMPROVED THILL-COUPLING.

The Schedule referred to in these Letters Patent and making part of the same.

*To all whom it may concern:*

Be it known that I, EDMUND A. HARVEY, of the city of Wilmington, in the State of Delaware, have invented a new and improved Thill-Coupling; and I do hereby declare that the following is a full, clear, and exact description of the construction and operation of the same, reference being had to the annexed drawings, making a part of this specification, in which—

Figure 1:
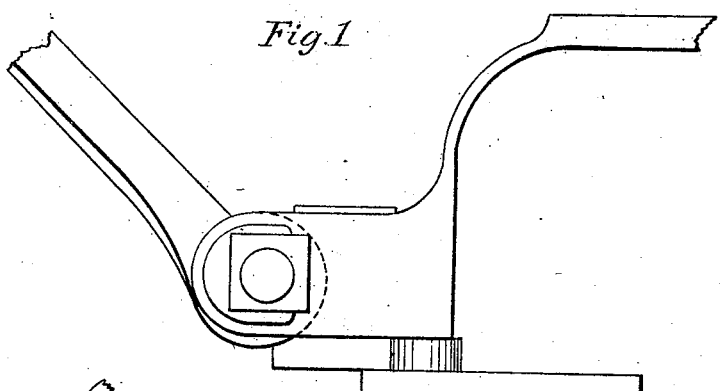

Figure 1 is a side view of the coupling.

Figure 2:
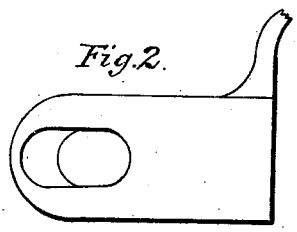

Figure 2, a side view of the clip, with its slotted or oblong hole.

Figure 3:
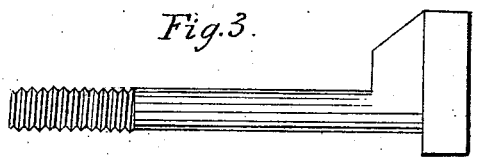

Figure 3, the bolt, with its inclined plane inside of the head.

Figure 4:

Figure 4, the key, with washer attached.

I compose my coupling of the ordinary clip, with jaws or lugs, and the common shaft-eye or boss.

The lugs of the clip I perforate with slotted or oblong holes, terminating at one or both ends with a bevel or inclined plane.

The bolt which passes through these slots or oblong holes and the eye or boss of the shaft-iron, is provided with an inclined plane or bevel inside of the head.

This bolt is provided, at the opposite end, with a key, attached to a washer, having a like inclined plane or bevel, acting or operating reciprocally with the plane or bevel within the head of the bolt, both corresponding to the plane in the slotted or oblong holes of the clip.

I do not wish to confine myself to the bolt with the inclined plane forged solid inside its head, nor to the key attached to the washer, inasmuch as the common bolt may be used with two keys without washers, producing the same result.

The practical operation of this invention is the more readily to connect or attach the thill-iron to the clip, where a gum or metallic spring is used, as in the ordinary coupling considerable force is required to compress the gum or spring, in order to bring the round holes in place, so that the ordinary bolt may enter.

By my device, with the slotted or oblong holes, the bolt passes through the shaft-eye easily, and as the nut is screwed up, the planes on the washer and inside the head, bearing against their corresponding planes in the oblong holes, readily force the bolt back to its place, bringing the eye or boss of the shaft-iron in firm contact with and compressing the gum or spring as desired.

What I claim as my invention, and desire to secure by Letters Patent, is—

1. The slotted or oblong holes in each of the lugs or jaws of the ordinary clip, each hole terminating, at one or both ends, with a bevel or inclined plane, for the purpose described.

2. The bolt, with or without an inclined plane inside the head, in combination with a key or keys, with or without washers attached.

3. The clip and bolt, with keys, as described, in combination with a gum or metallic spring, as and for the purposes described.

E. A. HARVEY.

Witnesses:
JAMES MOORE,
CHARLES A. WIGGINS.